United States Patent [19]

Cuisia et al.

[11] Patent Number: 4,581,145

[45] Date of Patent: Apr. 8, 1986

[54] COMPOSITION AND METHOD FOR INHIBITING SCALE

[75] Inventors: Dionisio G. Cuisia, Chicago; Chih M. Hwa; Anne H. Kemp, both of Palatine, all of Ill.

[73] Assignee: Dearborn Chemical Company, Lake Zurich, Ill.

[21] Appl. No.: 709,979

[22] Filed: Mar. 11, 1985

Related U.S. Application Data

[63] Continuation of Ser. No. 423,759, Sep. 27, 1982, abandoned.

[51] Int. Cl.$^4$ ................................................ C02F 5/14
[52] U.S. Cl. ..................................... 210/699; 210/700; 252/180
[58] Field of Search .............................. 210/698–701; 252/180, 181

[56] References Cited

U.S. PATENT DOCUMENTS

| 3,879,288 | 4/1975 | Siegele | 210/701 |
| 4,118,318 | 10/1978 | Welder et al. | 210/700 |
| 4,255,259 | 3/1981 | Hwa et al. | 210/699 |
| 4,306,991 | 12/1981 | Hwa et al. | 252/180 |
| 4,351,796 | 9/1982 | Marshall | 210/698 |

FOREIGN PATENT DOCUMENTS

| 1539974 | 11/1976 | United Kingdom . |
| 1581968 | 2/1978 | United Kingdom . |
| 1589109 | 5/1978 | United Kingdom . |
| 2023121 | 6/1979 | United Kingdom . |
| 2061249 | 5/1981 | United Kingdom . |

Primary Examiner—Peter Hruskoci
Attorney, Agent, or Firm—W. W. McDowell, Jr.

[57] ABSTRACT

The accumulation of scale in an aqueous system is inhibited by the addition of a composition comprising a copolymer of maleic acid or anhydride and vinyl sulfonic acid and an organic phosphonate such as aminotri(methylene phosphonic acid), hydroxyethylidene diphosphonic acid, or a water soluble salt thereof.

2 Claims, No Drawings

COMPOSITION AND METHOD FOR INHIBITING SCALE

This is a continuation of application Ser. No. 423,759, filed Sept. 27, 1982 now abandoned.

This invention relates to the treatment of aqueous systems and, more particularly, to the inhibition and removal of solid deposits in industrial heating and cooling systems.

The water used in industrial aqueous systems such as steam generating boilers, hot water heaters, heat exchangers, cooling towers, desalination systems, cleaning systems, pipe lines, gas scrubber systems, and associated equipment contains various impurities. The impurities typically include alkaline earth cations such as calcium, barium, and magnesium and several anions such as bicarbonate, carbonate, sulfate, oxalate, phosphate, silicate, and fluoride. These anions and cations combine and form precipitates due to the pH, pressure, or temperature in the system or the presence of additional ions with which they form insoluble products. The most common impurities in industrial water supplies are the water hardening ions such as the calcium, magnesium and carbonate ions. In addition to precipitating as carbonates, calcium and magnesium as well as any iron or copper present can also react with phosphate, sulfate, and silicate ions and form the respective complex insoluble salts. These solid reaction products accumulate on surfaces of the system and form scale. The water may also contain various solids such as mud, clay, iron oxides, silt, sand, and other mineral matter and microbiological debris that accumulate as sludge deposits in the system. Iron oxides may be present in the feedwater and may be produced by corrosion of metal surfaces in contact with the water. The sludge may become incorporated in the scale deposits and the precipitates tend to cement the sludge particles and form a strongly adherent scale.

Sludge and scale deposits greatly reduce heat transfer efficiency by settling at low flow points in the system and limiting the circulation of the water and insulating it from the heat surfaces. In addition to interfering with heat transfer and fluid flow, corrosion of metal surfaces underneath the deposits is facilitated since corrosion control agents are unable to contact the surfaces effectively. The deposits also harbor bacteria. Removal of the deposits can cause expensive delays and shutdown of the system. Water at the relatively high temperatures in steam generating boilers and hard waters are especially susceptible to scale formation. Extremely severe scale deposits can cause localized overheating and rupture in boilers.

Since external treatments such as softening, coagulation, and filtration do not adequately remove solids and solid-forming substances, various internal chemical treatments have been used to prevent and remove scale and sludge in aqueous systems. The chemical treatment for boilers generally involves the combined use of a precipitating agent and a solid conditioner to maintain the solids in the boiler water in a suspended state for effective removal with the water drained from the boiler by blowdown. The precipitating chemicals commonly employed for calcium salts are soda ash and sodium phosphates. Magnesium is precipitated by the alkalinity of boiler water as magnesium hydroxide.

A variety of polycarboxylate and other water soluble, polar polymers such as acrylate polymers have been used as solid conditioners in industrial water systems. The presence of small quantities of these polymers improves the fluidity of sludge and results in the formation of amorphous, frangible and serrated precipitates instead of hard, dense crystals that form scale on surfaces. The finely dispersed solid particles remain suspended and are carried out of the system by the flow of water or by blowdown.

Phosphonates are used extensively in water treatment as precipitation inhibitors and are effective in threshold amounts that are markedly lower than the stoichiometric amount required for chelating or sequestering the scale forming cation.

The scale inhibitor for aqueous systems of British Patent Publication No. 2 061 249 of Greaves and Ingham comprises a water soluble phosphonate and a vinyl addition type copolymer or water soluble salts thereof. The phosphonates contain at least one carboxylic acid group and at least one phosphonic acid group and have at least three acid groups attached to the carbon atom. The copolymers are generally derived from ethylenically unsaturated acids such as maleic acid (or anhydride), acrylic acid, and methacrylic acid and possess carboxylic or carboxylic anhydride groups and sulfonate groups. A particularly preferred phosphonate is 2-phosphonobutane-1,2,4-tricarboxylic acid. Preferred copolymers include a copolymer of methacrylic acid and 2-acrylamido-2-methylpropane sulfonic acid and a copolymer of styrene sulphonic acid and maleic acid. When $R_2$ is hydrogen and Y is a sulfonic acid radical in the disclosed formula for the sulfonate - containing unit of the copolymer and the ethylenically unsaturated unit is maleic anhydride, the copolymer is a copolymer of vinyl sulfonic acid and maleic anhydride. In the examples, it is demonstrated that combinations of a copolymer of methacrylic acid and 2-acrylamido-2-methyl propane sulfonic acid and the phosphonobutane carboxylic acids have a synergistic effect and that combinations of the polymer with other phosphonates including nitrilotrismethylene phosphonic acid, hydroxyethylidene diphosphonic acid, and hexamethylene diamine tetramethylene phosphonic acid, do not.

U.S. Pat. Nos. 4,255,259 and 4,306,991 of Hwa and Cuisia disclose a composition for inhibiting scale in aqueous systems which comprises a copolymer of styrene sulfonic acid and maleic anhydride or maleic acid and a water soluble phosphonic acid or salts thereof. Various phosphonic acids including hydroxyethylidene disphosphonic acid and amino methylene phosphonic acid may be used.

The composition for inhibiting formation of scale in an aqueous system of the present invention comprises (a) a copolymer of maleic acid or anhydride and vinyl sulfonic acid, or a water soluble salt thereof; and (b) an organic phosphonate of the general formula:

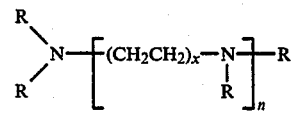

wherein R is

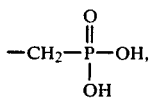

n is 0 to 6, and x is 1 to 6; or of the general formula:

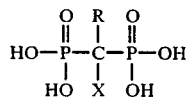

wherein X is —OH or —NH$_2$ and R is an alkyl group of from 1 to 5 carbon atoms; or a water soluble salt thereof. The method of inhibiting the formation of scale in an aqueous system of the present invention comprises adding to the system a scale inhibiting amount of the composition.

The present invention provides unexpectedly superior inhibition of deposition and formation of scale, particularly those containing calcium and magnesium phosphates and silicates and iron oxide, on the metallic structures of industrial water systems. The composition and method are effective when used in water at high temperatures and pressures in steam generating boilers and the copolymer remains soluble in water of high hardness and alkalinity. The invention exhibits the threshold effect of the inhibition of formation of metallic salt crystals and the prevention of their adherence to heat transfer surfaces at low treatment levels.

The present invention employs water soluble amino alkylene phosphonic acids, hydroxy or amino alkylidene phosphonic acids, or water soluble salts thereof. The most preferred compounds are aminotri(methylene phosphonic acid), hydroxyethylidene-1,1-diphosphonic acid and water soluble salts thereof. This alkylidene diphosphonic acid is commercially available and the preparation of this and other such phosphonic acids is described, for example, in U.S. Pat. Nos. 3,214,454 and 3,297,578. The most preferred aminophosphonic acid is commercially available and the preparation of this and other such phosphonic acids is described in U.S. Pat. Nos. 3,234,124 and 3,298,956. Other suitable phosphonic acids having these formulas include ethylenediamine tetra(methylene phosphonic acid), diethylenetriamine penta(methylene phosphonic acid), triethylenetetraamine hexa(methylene phosphonic acid), hexamethylenediamine tetra(methylene phosphonic acid), aminoethylidene diphosphonic acid, aminopropylidene diphosphonic acid, hydroxypropylidene diphosphonic acid, hydroxybutylidene diphosphonic acid, and hydroxyhexylidene diphosphonic acid.

The composition of the present invention further comprises an aliphatic copolymer of maleic acid or anhydride and vinyl sulfonic acid or water soluble salts thereof. The polymers may be prepared by copolymerizing maleic acid or anhydride with vinyl sulfonic acid or an alkali metal salt thereof. Conventional addition polymerization methods in the presence of light or free radical initiators may be employed. Generally, the copolymerization may be effected at from about 30° to about 120° C. using a peroxide catalyst such as hydrogen peroxide or benzoyl peroxide in an inert medium. The copolymer may be derived, for example, by solution polymerization of maleic acid and sodium vinyl sulfonate in the presence of hydrogen peroxide.

Another method of producing the copolymers is to copolymerize a polymerizable mono-ethylenic compound such as methyl vinyl ether, ethyl vinyl ether, or vinyl acetate; resolubilize the polymer by alkaline or acid hydrolysis to substitute hydroxyl groups for the ether or ester groups; and sulfonate the polymer in accordance with conventional methods such as described in U.S. Pat. No. 2,764,576. The degree of sulfonation can vary but substantially complete sulfonation is preferred.

The relative proportions of vinyl sulfonate and maleic anhydride depend upon the degree of scale inhibition needed. The copolymer generally contains from about 10 to about 90 mole percent of the sulfonate. Preferably, the mole ratio of vinyl sulfonate moieties to maleic acid derived moieties is from about 0.5:1 to about 4:1 and especially is from about 1:1 to about 2:1.

The average molecular weight of the copolymer is not critical so long as the polymer is water soluble. Generally, the molecular weight ranges from about 500 to about 100,000. The molecular weight is preferably from about 1,000 to about 25,000 and especially is from about 6,000 to about 10,000.

The acid form of especially preferred copolymers have the formula:

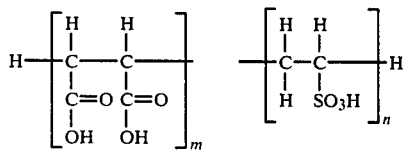

where m and n are in random order and m is from about 20 to about 70 mole percent, n is from about 30 to about 80 mole percent, and the molecular weight is from about 1,000 to about 25,000.

The phosphonates and the copolymers are generally used in the form of an alkali metal salt and usually as the sodium salt. Other suitable water soluble salts include potassium, ammonium, zinc, and lower amine salts. The free acids may also be used and all of the acidic hydrogens need not be replaced nor need the cation be same for those replaced. Thus, the cation may be any one of or a mixture of NH$_4$, H, Na, K, etc. The copolymer is converted into the water soluble salts by conventional methods.

While it is possible to add the phosphonate and the copolymer separately to an aqueous system, it is generally more convenient to add them together in the form of a composition. The composition of the present invention generally comprises from about 0.1 to about 100, preferably about 2 to 6, parts by weight of the copolymer and from about 0.1 to about 100, preferably about 0.5 to 5, parts by weight of the phosphonate. The polymer and phosphonate are used in weight ratios generally of about from 10:1 to about 1:10, preferably of from about 4:1 to about 1:4, and especially of about 1:1.

The compositions may be added as dry powders and permitted to dissolve during use but normally are used in the form of aqueous solutions. The solutions generally contain from about 0.1 to about 70 weight percent of the composition and preferably contain from about 1 to about 40 weight percent. The solutions can be made by adding the ingredients to water in any order.

The amount of the composition added to the water is a substoichiometric amount that is effective to inhibit scale and sludge and depends on the nature of the aqueous system to be treated. The phosphonate dosage depends to some extent on the amounts of hardness causing and scale forming compounds present in the system. Generally, the amount is calculated from the calcium concentration and consequent water hardness. The copolymer dosage depends to some extent on the concentration of suspended solids and existing levels of solids buildup in the system. The composition generally is added to the aqueous system in an amount of from about 0.01 to about 500 parts per million (p.p.m.) and preferably of from about 0.1 to about 50 parts per million of system water.

The compositions of this invention may include or be added to water containing other ingredients customarily employed in water treatment such as alkalies, lignin derivatives, other polymers, tannins, other phosphonates, biocides, and corrosion inhibitors. The composition may be introduced at any location where it will be quickly and efficiently mixed with the water of the system. The treatment chemicals are customarily added to the makeup or feed water lines through which water enters the system. Typically, an injector calibrated to deliver a predetermined amount periodically or continuously to the makeup water is employed.

The present invention is especially useful in the treatment of the feed or makeup water in a steam generating boiler. Such boiler systems are generally operated at a temperature of from about 298° to about 637° F. and a pressure of from about 50 to about 2,000 psig.

The composition and method for its use of this invention are illustrated by the following examples in which all parts are by weight unless otherwise indicated.

EXAMPLES 1 and 2

Aqueous solutions of a composition containing one part of hydroxyethylidene diphosphonic acid or aminotri(methylene phosphonic acid) and one part of a copolymer of sodium vinyl sulfonate and maleic anhydride having a molecular weight of 8,000 and a sodium vinyl sulfonate to maleic anhydride mole ratio of 1.5:1 were prepared. The treatment solutions also contained sodium phosphate, sodium sulfate, sodium sulfite, sodium hydroxide, and sodium chloride in amounts sufficient to provide the boiler water composition shown below in Table I. Solutions containing the identical amounts of the treatment chemicals except for the composition of the present invention and solutions containing the identical amounts of the treatment chemicals and one part of each component of the composition were also prepared.

The sludge conditioning and scale inhibiting properties of these solutions were evaluated in a small laboratory boiler which had three removable tubes as described in the Proceedings of the Fifteenth Annual Water Conference, Engineers Society of Western Pennsylvania, pp. 87-102 (1954). The feedwater for the laboratory boiler was prepared by diluting Lake Zurich, Ill. tap water with distilled water to 40 ppm total hardness as $CaCO_3$ and adding calcium chloride to provide a 6 to 1 elemental calcium to magnesium ratio. The feedwater and chemical treatment solutions were fed to the boiler in a ratio of 3 volumes of feedwater to 1 volume of solution giving a feedwater total hardness of 30 ppm of $CaCO_3$. The scaling tests for all the treatment solutions were conducted by adjusting boiler blowdown to 10 percent of the boiler feedwater giving approximately 10 concentrations of the boiler water salines and adjusting the composition of the treatment solution to give a boiler water after the 10 concentrations having the composition shown in Table I.

TABLE I

| | | |
|---|---|---|
| Sodium Hydroxide as NaOH | 258 | ppm |
| Sodium Carbonate as $Na_2CO_3$ | 120 | ppm |
| Sodium Chloride as NaCl | 681 | ppm |
| Sodium Sulfite as $Na_2SO_3$ | 50 | ppm |
| Sodium Sulfate as $Na_2SO_4$ | 819 | ppm |
| Silica as $SiO_2$ | less than 1 | ppm |
| Iron as Fe | less than 1 | ppm |
| Phosphate as $PO_4$ | 10-20 | ppm |

The scaling tests were run for 45 hours each at a boiler pressure of 400 psig. At the completion of a test, the boiler tubes were individually removed from the boiler and the scale or deposit present on 6 inches of the central length of each tube was removed by scraping, collected in a tared vial, and weighed. The results of the tests are shown in Table II.

TABLE II

| Run No. | Additive | Additive Dosage in the Feed (ppm) | Scaling Rate (g/ft²/hr) | Scale Reduction (%) |
|---|---|---|---|---|
| 1 | None (Blank) | — | 0.188 | — |
| 2 | Sodium vinyl sulfonate and maleic anhydride copolymer (I) | 1 | 0.029 | 84.6 |
| 3 | Hydroxyethylidene diphosphonic acid (II) | 1 | 0.145 | 22.9 |
| 4 | Aminotri(methylene phosphonic acid) (III) | 1 | 0.074 | 60.6 |
| 5 | I + II | 1 | 0.002 | 98.9 |
| 6 | I + III | 1 | 0.015 | 92.0 |

The comparative results on scale formation shown in Table II demonstrate that the composition and method of the present invention provide scale inhibition that is very considerably superior to that of the components added alone.

We claim:

1. A composition for inhibiting formation of scale in an aqueous system comprising an aqueous solution of a composition comprising
   (a) a copolymer of maleic ahydride and vinyl sulfonic acid, said copolymer having a molecular weight of from about 6,000 to about 10,000 and a vinyl sulfonic acid to maleic anhydride mole ratio of from about 1:1 to about 2:1, or a water soluble salt thereof; and
   (b) hydroxyethylidene-1,1-diphosphonic acid or aminotri(methylene phosphonic acid), or a water soluble salt thereof; said copolymer and said phosphonic acid being present in a weight ratio of about 1:1.

2. A method of inhibiting formation of scale in a stream generating boiler comprising adding to the boiler water an aqueous solution of a composition comprising
   (a) a copolymer of maleic anhydride and vinyl sulfonic acid, said copolymer having a molecular weight of from about 6,000 to about 10,000 and a vinyl sulfonic acid to maleic anhydride mole ratio of from about 1:1 to 2:1, or a water soluble salt thereof; and
   (b) hydroxyethylidene-1,1-diphosphonic acid or aminotri(methylene phosphonic acid), or a water soluble salt thereof; said composition having a weight ratio of component (a) to component (b) of about 1:1 and being added to the boiler in an amount of from about 0.1 to about 50 parts per million of water in the boiler.

* * * * *